(12) United States Patent
Williamson

(10) Patent No.: US 6,586,710 B2
(45) Date of Patent: Jul. 1, 2003

(54) COFFEE MAKER HEATER/WARMER PLATE ASSEMBLY

(75) Inventor: Steve Williamson, Arvonia, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 49 days.

(21) Appl. No.: 09/984,725

(22) Filed: Oct. 31, 2001

(65) Prior Publication Data

US 2003/0080107 A1 May 1, 2003

(51) Int. Cl.[7] .......................... A47J 31/02; A47J 31/54; F24H 1/00; H05B 3/02
(52) U.S. Cl. .................. 219/433; 219/432; 219/436; 392/480
(58) Field of Search ................ 219/436, 433, 219/536, 521, 535; 392/467, 480

(56) References Cited

U.S. PATENT DOCUMENTS

| | | |
|---|---|---|
| 2,269,111 A | 1/1942 | Jepson et al. |
| 2,504,728 A | 4/1950 | Purpura |
| 2,520,788 A | 8/1950 | Wales |
| 2,537,167 A | 1/1951 | Snyder |
| 2,729,739 A | 1/1956 | Howard |
| 2,850,616 A | 9/1958 | Hatch |
| 2,872,560 A | 2/1959 | Bowles |
| 3,280,303 A | 10/1966 | Krauss et al. |
| 3,589,271 A | 6/1971 | Tarrant et al. |
| 3,953,923 A | 5/1976 | Rygmyr |
| 4,000,396 A | 12/1976 | Abel, Jr. |
| 4,083,295 A | 4/1978 | Hollingsworth |
| 4,138,936 A | 2/1979 | Williams |
| 4,150,607 A | 4/1979 | Kemp |
| 4,155,291 A | 5/1979 | Ryckman et al. |
| 4,160,152 A | 7/1979 | Wightman |
| 4,164,644 A | 8/1979 | Remsnyder et al. |
| 4,165,681 A | 8/1979 | Belinkoff |
| 4,206,341 A | 6/1980 | Leuschner et al. |
| 4,214,148 A | 7/1980 | Fleischhauer |
| 4,303,827 A | 12/1981 | Kyles |
| 4,328,740 A | 5/1982 | McDonough |
| 4,331,067 A | 5/1982 | Mysicka |
| 4,356,381 A | 10/1982 | Flaherty, Jr. et al. |
| 4,375,028 A | 2/1983 | Wood |
| 4,402,257 A | 9/1983 | Marotta |
| 4,414,884 A | 11/1983 | McLean |
| 4,438,325 A | 3/1984 | Gellert |
| 4,467,707 A | 8/1984 | Amiot |
| 4,495,404 A | 1/1985 | Carmichael |
| 4,546,697 A | 10/1985 | Schaeffer |
| 4,558,204 A | 12/1985 | Bleckmann |
| 4,630,532 A | 12/1986 | Sonnentag et al. |

(List continued on next page.)

FOREIGN PATENT DOCUMENTS

| | | |
|---|---|---|
| CA | 1082276 | 7/1976 |
| DE | 2258394 | 6/1974 |
| DE | 2258897 | 6/1974 |
| DE | 2821878 | 4/1979 |
| DE | 3709268 | 9/1988 |
| DE | 379232 | 2/1989 |
| EP | 0019219 | 5/1980 |
| EP | 0330232 | 8/1989 |
| FR | 1313934 | 11/1962 |
| FR | 1577506 | 6/1969 |
| FR | 2067881 | 8/1971 |
| FR | 2554913 | 11/1984 |

*Primary Examiner*—Joseph Pelham
(74) *Attorney, Agent, or Firm*—John H. Thomas, P.C.

(57) ABSTRACT

A coffee maker heater/warmer plate assembly includes a spring wire clamp that retains the flow-through heater centered against the bottom of the warmer plate. The spring clamp has ends that are attached to a support ring. The clamp engages a flow-through heater and biases it against the bottom of a warmer plate that is retained by the support ring.

9 Claims, 5 Drawing Sheets

U.S. PATENT DOCUMENTS

| | | |
|---|---|---|
| 4,645,910 A | 2/1987 | Chhatwal |
| 4,683,812 A | 8/1987 | Tarlow et al. |
| 4,697,501 A | 10/1987 | Hupf |
| 4,715,269 A | 12/1987 | Stoner |
| 4,741,259 A | 5/1988 | Ogata et al. |
| 4,744,291 A | 5/1988 | Wallin |
| 4,748,901 A | 6/1988 | Burmeister |
| 4,772,777 A * | 9/1988 | Weller et al. ............... 392/467 |
| 4,790,240 A | 12/1988 | Henn et al. |
| 4,843,955 A | 7/1989 | Henn et al. |
| 5,081,915 A | 1/1992 | Beumer |
| 5,243,684 A | 9/1993 | Edwards |
| 5,280,560 A | 1/1994 | Salomon |

* cited by examiner

COFFEE MAKER HEATER/WARMER PLATE ASSEMBLY

This invention relates to an automatic drip coffee maker having a new flow-through heater/warmer plate assembly. Specifically, a spring wire clamp holds the heater centered against the bottom of the warmer plate.

BACKGROUND OF THE INVENTION

Typical automatic drip coffee makers (ADC's) have a pedestal with a cold water reservoir, a head projecting forwardly from the upper end of the pedestal which houses a brew basket, and a base projecting from the lower end of the pedestal which houses a flow-through heater. The base usually has an upper wall having an opening for a warmer plate that is aligned with the brew basket upon which a carafe can be positioned for receiving brewed coffee from the brew basket. In many cases, the upper wall is molded integrally with the lower part of the pedestal and has depending front and side wall members to form the cavity for the flow-through heater. A separate bottom cover connected to the upper wall closes the bottom of the housing base.

One conventional flow-through heater includes an elongate, rope-like heating element bent to a U-shape and a water pipe beneath and substantially coextensive with the heating element. The water pipe and the heating element have a common rigid housing and are in good thermal contact with one another. The warmer plate, which is located above the opening in the upper wall of the housing base is drawn downwardly into engagement with the upper wall of the base by means of a threaded post welded to the bottom center of the warmer plate and a nut engaged with the post which is tightened against the outside bottom surface of the bottom cover. A clamp bar held by another nut threaded on the post holds the heater against the bottom surface of the warmer plate. This style of construction may cause a warmer plate to warp, so it is necessary to apply a thermal conducting compound between the heating element and warmer plate to achieve a reliable thermal contact between them.

In a further embodiment, a single, metal spring clip may be attached to a support ring. The clip is positioned so that it extends in one, straight line across the U-shaped heating element and urges it upwardly against the bottom of the warmer plate. This straight clamp is intended to center and hold the heating element tight onto the warmer plate. However, the contact of the spring along a single axis allows the heating element to have some rotational movement. Further, in the event of any warping of the warming plate or the support ring, the securement against the bottom of the warmer plate is not necessarily reliable.

SUMMARY OF THE INVENTION

Accordingly, it is an object of the present invention to overcome the foregoing drawbacks and provide a reliable assembly for centering a heater against of the warmer plate in an ADC.

In one embodiment, a coffee maker heater/warmer plate assembly comprises a support ring, a warmer plate, a flow-through heater and a spring clamp. The support ring is adapted to engage the outside edge of the top of the warmer plate. The spring clamp has ends that are adapted to be engaged with the support ring wherein the spring clamp further engages the flow-through heater and biases the flow-through heater against the bottom of the warmer plate. The spring clamp further comprises two legs, each having opposite ends engaging mutually spaced apart shoulders on the supporting ring. Intermediate portions of the legs of the spring clamp engage both the bottom and side surfaces of the flow-through heater. Alternatively, the spring clamp may comprise a single, V-shaped wire. The spring clamp may be comprised of steel wire. Additionally, the support ring may comprise three shoulders that are spaced approximately 120 degrees from each other, and the ends of the spring clamp engage the shoulders. Still further, the flow-through heater may be substantially U-shaped.

In a further embodiment, a coffee maker heater/warmer plate assembly comprises a warmer plate, a flow-through heater, spring clamp means, and a support ring. The spring clamp means retain the heater and bias it against the bottom of the warmer plate. The support ring further comprises means for securing the spring clamp means. The spring clamp means comprises two legs and is adapted to engage both the bottom and side surfaces of the heater, thereby confining the heater both horizontally and vertically on the bottom of the warmer plate. The spring clamp means may comprise a single, V-shaped wire. That wire may be comprised of steel. Still further, the securing means may be spaced approximately 120 degrees from each other. The flow-through heater may be substantially U-shaped.

DETAILED DESCRIPTION OF THE INVENTION

Figure 1:
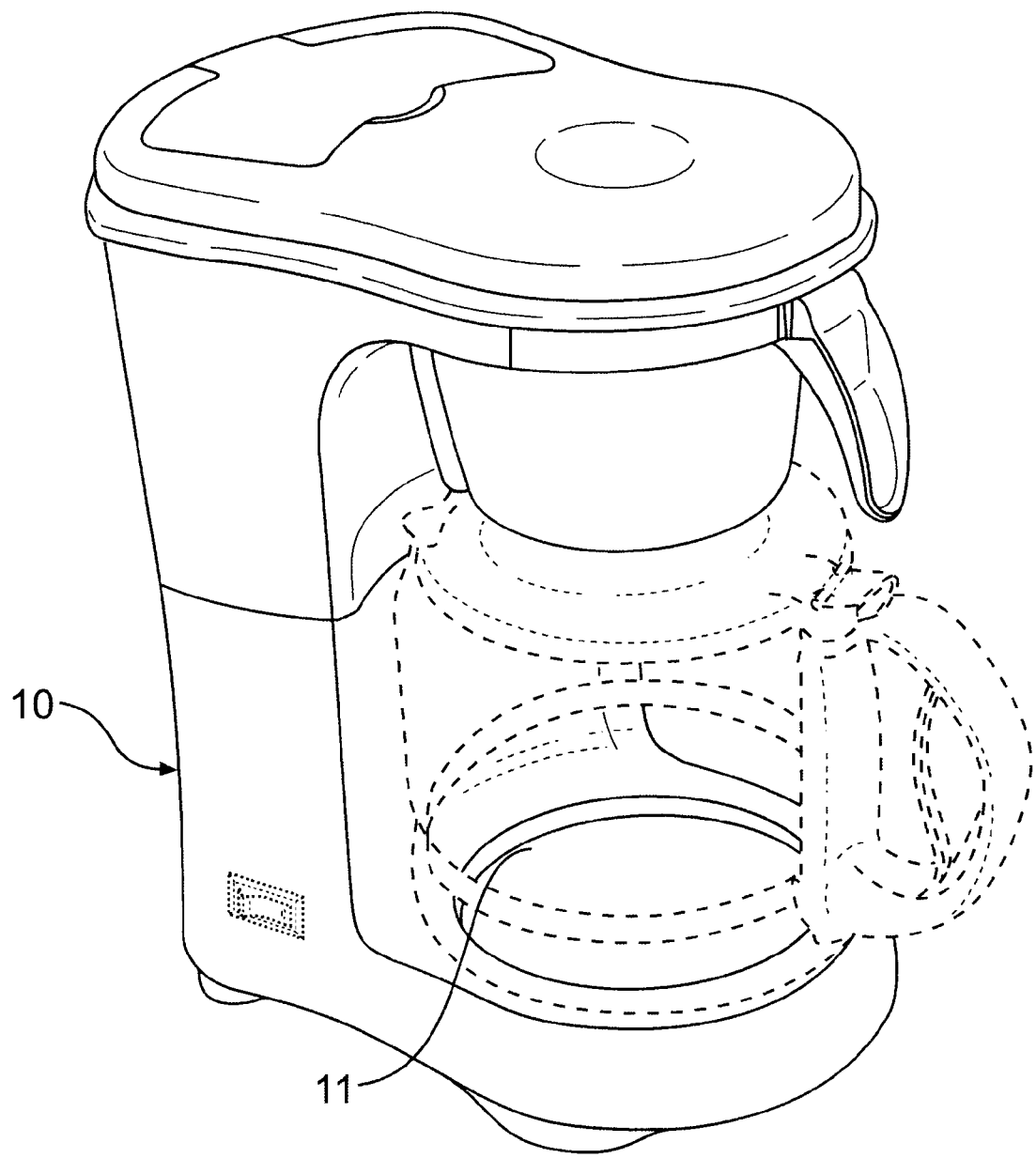
FIG. 1 is a perspective view of a coffee maker having a warming plate in accordance with the present invention.

The coffee maker heater/warmer plate assembly of the present invention may be used in connection with many different types and styles of coffee maker. FIG. 1 is merely one embodiment of a coffee maker that incorporates the present invention. The coffee maker 10 has a heater/warmer plate assembly 11 that is the surface on which a coffee carafe rests.

Figure 2:
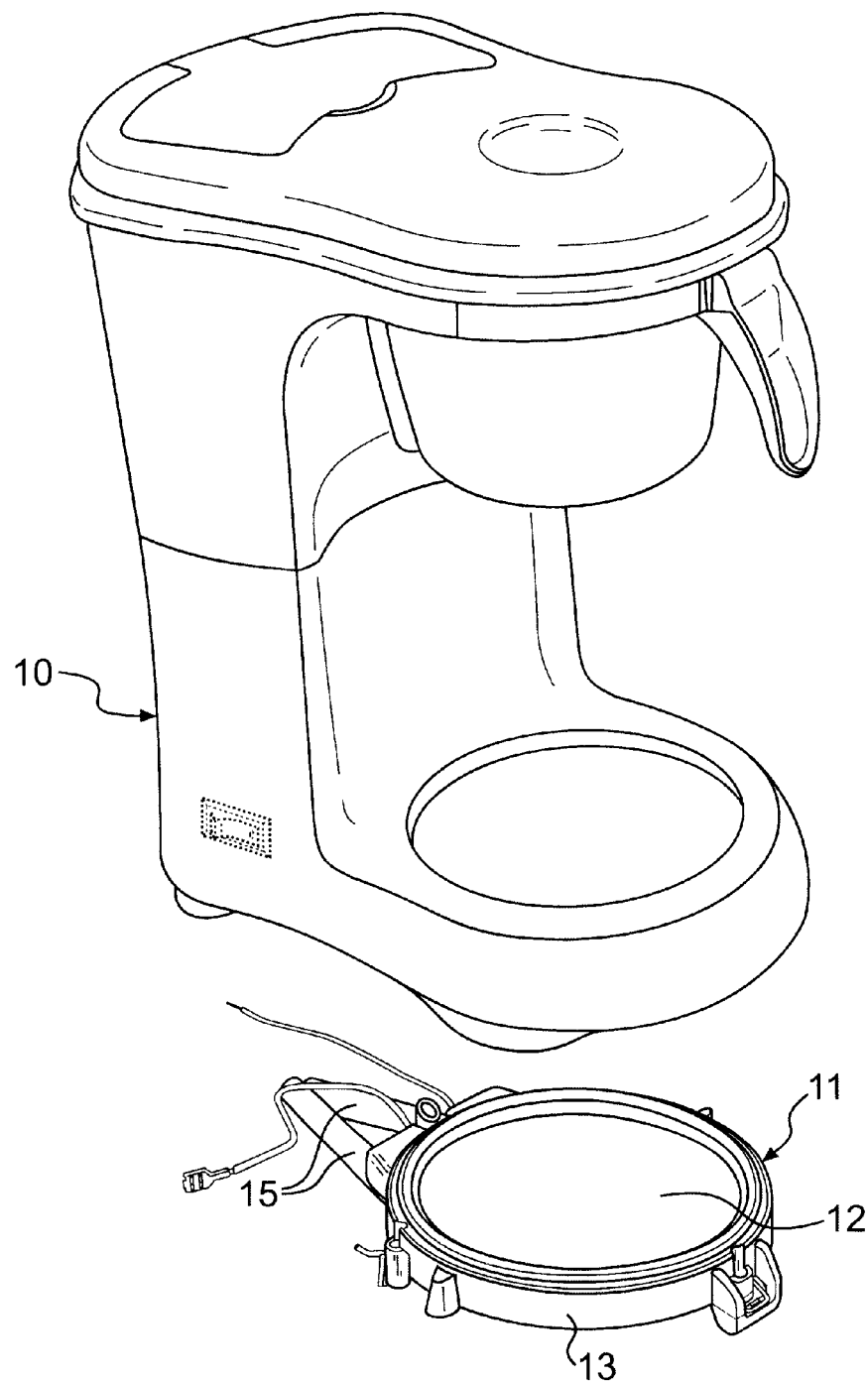
FIG. 2 is a partially exploded view of FIG. 1 showing the heater/warmer plate assembly in accordance with the present invention.

FIG. 2 shows the same coffee maker 10 with the heater/warmer plate assembly 11 exploded out from it. The assembly 11 includes the warmer plate 12 and a support ring 13. Rubber hoses 15 extend from the back and underneath the warmer plate 12—one connected to a fresh water supply and the other to a hot water shower head within the coffee maker in a conventional manner.

Figure 3:
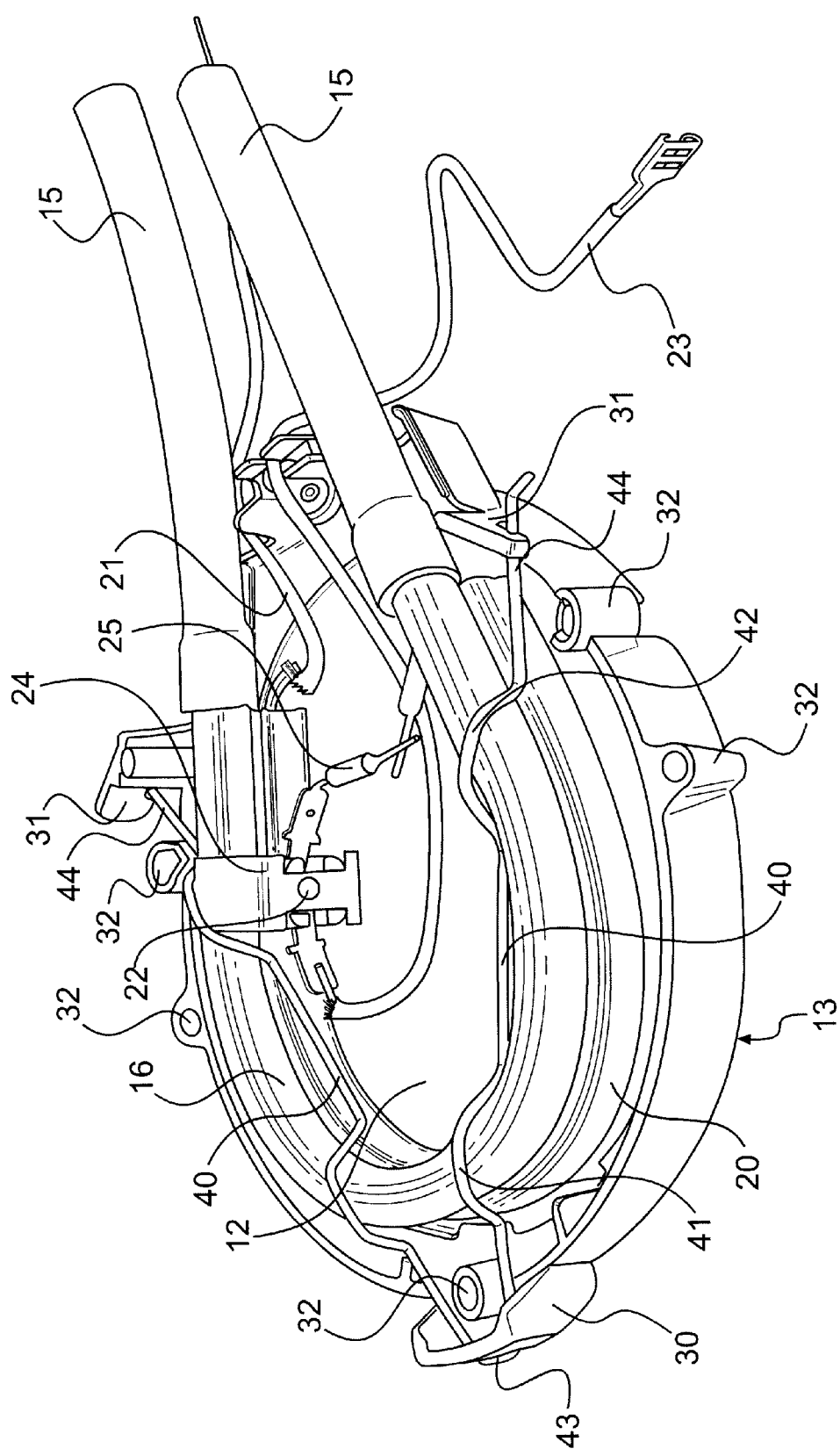
FIG. 3 is a perspective, bottom view of the heater/warmer plate assembly in accordance with the present invention.
Figure 4:
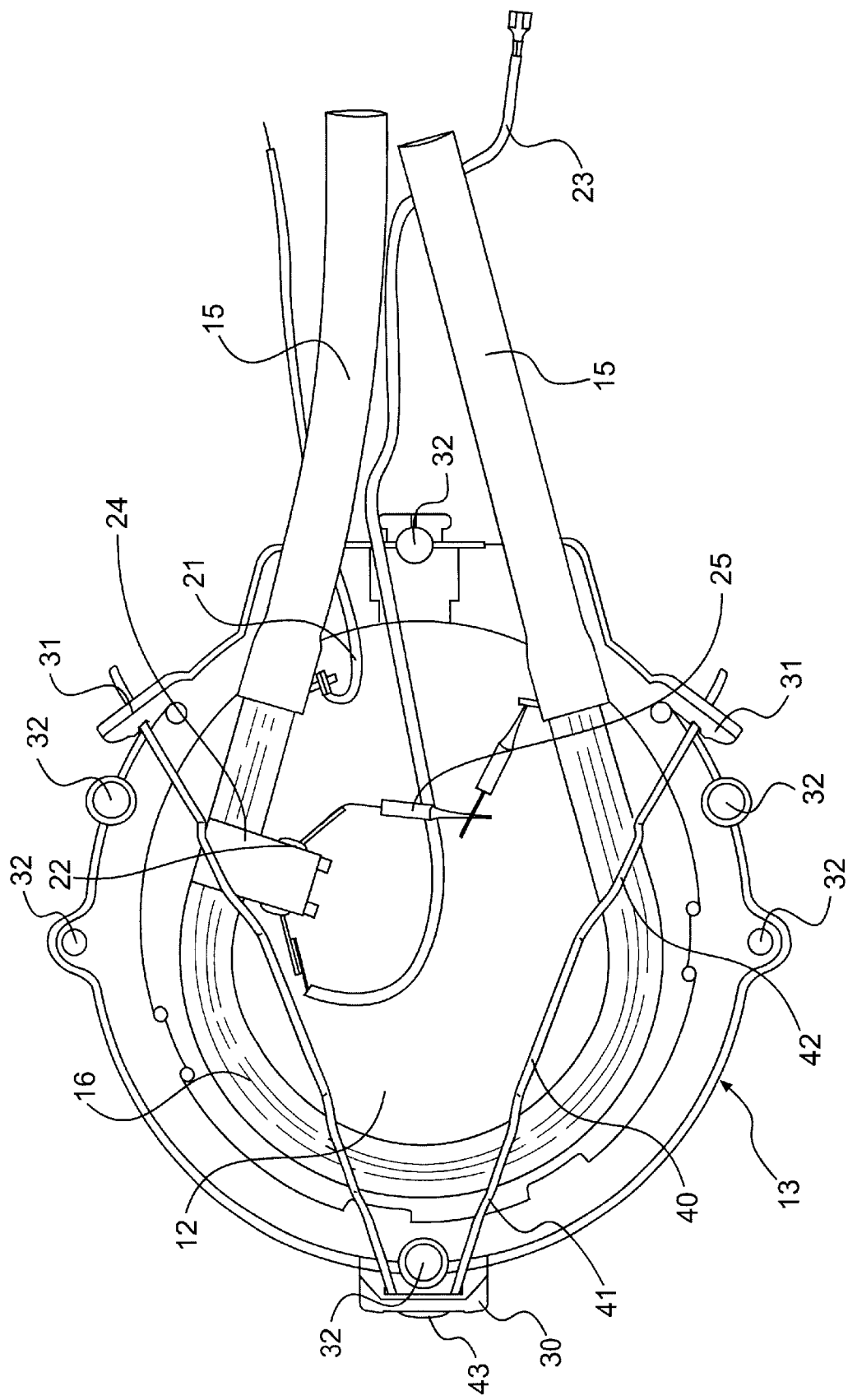
FIG. 4 is a bottom elevation view of the heater/warmer plate assembly in accordance with the present invention.

FIGS. 3 and 4 illustrate the heater/warmer plate assembly in greater detail. The support ring 13 is engaged across it's circular open portion by the warmer plate 12. The top of the warmer plate 12, and specifically the outside edge of the warmer plate engages the support ring 13. Rubber tubes 15 are connected to either end of the flow-through heater 16. The heater 16 is U-shaped or horseshoe-shaped. The heating element 20 is in close adjacent relationship to the heater 16 as well as to the warmer plate 12. A wire 21 powers the heating element 20 and is actuated by an on/off button(not shown). The actual temperature of the heating element 20 is governed by a thermostat 22 held in place by a clip 24. The thermostat 22 is powered by the connection wire 23. In this way, the heating element 20 can be activated to maximum power when fresh water is being passed through the flow-through heater 16. Once that water has passed through the heater 16, however, the thermostat 22 then detects the rise in temperature over a preset value and cuts the power into the heater 20. In this way, the coffee that is contained within a carafe on top of the warmer plate(see FIG. 1, for instance) will not be overheated. Similarly, the element 20 will not itself overheat and possibly cause the coffee maker to warp. Finally, there are thermal cutoffs 25 that further prevent overheating.

Figure 5:
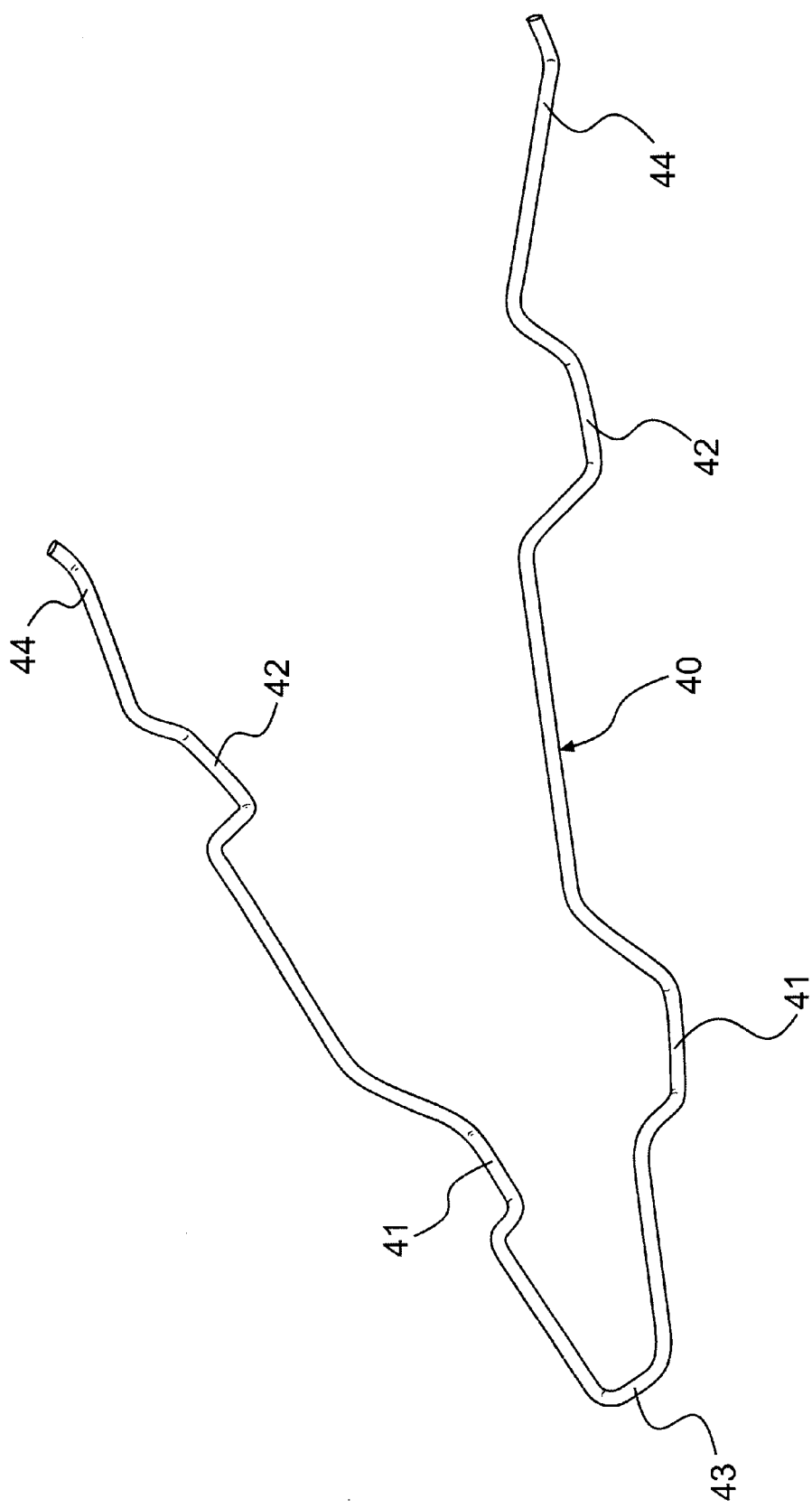
FIG. 5 is a perspective view of a spring clamp in accordance with the present invention.

Shoulders 30 and 31 on the support ring 13 are adapted to engage a spring clamp 40. Generally speaking, the structure of a shoulder that engages a spring clamp may be an aperture, hook, slot or other mechanical engaging or securing means. As shown, and as seen more explicitly in FIG. 5, the spring clamp 40 is a V-shaped clamp. In other words, the clamp 40 has two legs that meet at the point 43 of the clamp. That point 43 is engaged within an aperture of shoulder portion 30. The ends 44 of the opposite ends of the legs of the spring 40 are engaged similarly by the shoulder portions 31. When pressed in place, the clamp 40 holds the heater 20 in place against the bottom of the warmer plate 12. Further, the intermediate portions of the legs, bends 41 and 42, on each leg of the spring clamp 40 engage the flow through heater 16 to keep it centered on the warming plate 12. In other words, the bends 41 and 42 engage not only the bottom but also the side of the flow through heater 16 to prevent any lateral movement of the heater.

The shoulders 30 and 31 are spaced approximately 120° apart from each other on the support frame 13. This configuration, in combination with the U-shaped heater 16 is able to secure the heater 16 against the bottom of the warmer plate 12. Other shapes of heaters may compel alternative shapes of spring clamps. As shown, the spring clamp 40 is a single piece; however, it could also be two separate legs. The spring clamp could also be more than two legs. For instance, if the warmer plate is relatively large, then it could be desirable to have a spring clamp having more than two legs to ensure that the heating element is secured across the large warming plate.

Also, the spring clamp 40 is preferably formed from steel wire. Steel wire can be easily processed during manufacturing to have the correct shape that engages a heater 20 and snaps into place in the supporting ring 13. Alternatively, however, a clamp may be fabricated of a cast metal, plastic or any composite.

The preferred embodiment of the spring claim 40 is "v"-shaped as shown. Other shapes including a squared-u shape could be used. Asymmetric shapes may also be preferable or required depending on the assembly of a heater and warmer plate. It is only essential that the clamp have at least two legs that are adapted to engage the bottom and sides of a heater and bias the heater against a warming plate.

Apertures 32 spaced around the support ring 13 are simply different means for connecting the support ring to a coffee maker housing and, for instance, to the base plate of a coffee maker. The placement of the apertures 32 around the circumference of the support ring 13 merely further assist in keeping the support ring secure. It also reduces the chances of warping of warmer plate and housing.

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What is claimed is:

1. A coffee maker heater/warmer plate assembly comprising a support ring, a warmer plate, a flow-through heater and a spring clamp, the support ring being adapted to engage the outside edge of the top of the warmer plate, and wherein the spring clamp comprises two legs, each leg having opposite ends engaging mutually spaced apart shoulders on the support ring, and intermediate portions which engage both bottom and side surfaces of the flow-through heater, and wherein the spring clamp further biases the flow-through heater against the bottom of the warmer plate, thereby confining the heater both vertically and horizontally on the bottom of the warmer plate.

2. The coffee maker heater/warmer plate assembly described in claim 1, wherein the spring clamp comprises a single, V-shaped wire.

3. The coffee maker heater/warmer plate assembly described in claim 1, wherein the spring clamp is comprised of steel wire.

4. The coffee maker heater/warmer plate assembly described in claim 1, wherein the support ring comprises three shoulders that are spaced approximately 120 degrees from each other, and further wherein the ends of the spring clamp engage the shoulders.

5. The coffee maker heater/warmer plate assembly described in claim 1, wherein the flow-through heater is substantially U-shaped.

6. The coffee maker heater/warmer plate assembly described in claim 4, wherein the flow-through heater is substantially U-shaped.

7. A coffee maker heater/warmer plate assembly comprising:

a warmer plate, a flow-through heater, spring clamp means for retaining the heater and biasing it against the bottom of the warmer plate, and a supporting ring, the ring comprising means for securing the spring clamp means, wherein the securing means are spaced approximately 120° from each other, and further wherein the spring clamp means comprises two legs and is adapted to engage both the bottom and side surfaces of the heater thereby confining the heater both horizontally and vertically on the bottom of the warmer plate.

8. The coffee maker heater/warmer plate assembly described in claim 7, wherein the spring clamp means comprises a single, V-shaped wire.

9. The coffee maker heater/warmer plate assembly described in claim 7, wherein the flow-through heater is substantially U-shaped.

* * * * *